United States Patent
Dettinger et al.

(10) Patent No.: US 7,599,924 B2
(45) Date of Patent: Oct. 6, 2009

(54) RELATIONSHIP MANAGEMENT IN A DATA ABSTRACTION MODEL

(75) Inventors: Richard D. Dettinger, Rochester, MN (US); Daniel P. Kolz, Rochester, MN (US); Richard J. Stevens, Rochester, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 10/877,238

(22) Filed: Jun. 25, 2004

(65) Prior Publication Data

US 2005/0289184 A1     Dec. 29, 2005

(51) Int. Cl.
G06F 17/30  (2006.01)

(52) U.S. Cl. .......................................................... 707/4

(58) Field of Classification Search ............... 707/3, 707/100, 102, 103 X, 103 R, 103 Z, 103 Y, 707/2, 4, 101

See application file for complete search history.

(56) References Cited

U.S. PATENT DOCUMENTS 5,721,903 A * 2/1998 Anand et al. .................... 707/5
6,076,092 A * 6/2000 Goldberg et al. ........ 707/103 R
6,725,227 B1   4/2004 Li
6,983,288 B1 * 1/2006 Kirkwood et al. ....... 707/103 R
7,085,757 B2 * 8/2006 Dettinger et al. ............... 707/3
2004/0199540 A1* 10/2004 Nojima ....................... 707/102
2004/0205050 A1* 10/2004 Stevens et al. .................. 707/3

OTHER PUBLICATIONS

Khokhar et al., A Heterogeneous Processing (HP) Framework for Multimedia Query Processing, Heterogeneous Computing Workshop, 1994., Proceedings, Apr. 26, 1994, pp. 51-57.*

Dettinger et al., IBM U.S. Appl. No. 10/083,075, filed Feb. 26, 2002, "Application Portability and Extensibility Through Database Schema and Query Abstraction".

Proceedings EMMSAD'02, Join Constraints, Terry Halpin, Microsoft Corporation, USA, pp. 121-131.

* cited by examiner

*Primary Examiner*—Greta L Robinson
(74) *Attorney, Agent, or Firm*—Patterson & Sheridan, LLP

(57) ABSTRACT

A method, system and article of manufacture for managing relationships in a data abstraction model abstractly describing data in a database. One embodiment provides a method of linking logical branches of data in a database based on the relationships. The method includes accessing a data abstraction model abstractly describing the data in the database. The data abstraction model defines a logical tree structure having a plurality of logical branches. Relationships between logical fields of different logical branches are identified and logical links abstractly describing the identified relationships are created.

12 Claims, 11 Drawing Sheets

RELATIONSHIP MANAGEMENT IN A DATA ABSTRACTION MODEL

CROSS-RELATED APPLICATION

This application is related to the following commonly owned application: U.S. patent application Ser. No. 10/083,075 now U.S. Pat. No. 6,996,558, filed Feb. 26, 2002, entitled "APPLICATION PORTABILITY AND EXTENSIBILITY THROUGH DATABASE SCHEMA AND QUERY ABSTRACTION", which is hereby incorporated herein in its entirety.

BACKGROUND OF THE INVENTION

1. Field of the Invention

The present invention generally relates to managing data abstraction models and, more particularly, to managing relationships in a data abstraction model abstractly describing data in a database.

2. Description of the Related Art

Databases are computerized information storage and retrieval systems. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

In commonly assigned U.S. patent application Ser. No. 10/083,075 (the '075 application), filed Feb. 26, 2002 entitled "APPLICATION PORTABILITY AND EXTENSIBILITY THROUGH DATABASE SCHEMA AND QUERY ABSTRACTION", a framework was disclosed for abstractly viewing physical data. The framework of the '075 application provided a requesting entity (i.e., an end-user or application) with a logical representation of physical data. In other words, the framework of the '075 application provided the requesting entity with a data abstraction model that logically describes an underlying physical data structure. In this way, the requesting entity is decoupled from the underlying physical data to be accessed. Thus, changes to the physical data do not necessitate changes to applications accessing the physical data. Furthermore, abstract queries based on the framework can be constructed without regard for the makeup of the physical data.

Using a data abstraction model according to the framework of the '075 application, abstract queries can be transformed into executable queries capable of being executed against physical data in databases. However, in specific cases a given abstract query can be transformed into more than one executable query dependent on the data abstraction model. For instance, assume a user in a hospital who wants to determine names of patients having had a given blood test with a corresponding result value greater than 200. To this end, the user may specify the following abstract query:

FIND NAME
WHERE RESULT >200

However, when dealing in the data abstraction model, the term NAME may refer to more than one physical parameter in the underlying database (e.g., the name of a patient OR a doctor in a medical environment, the name of an employee OR customer in a manufacturing environment, etc.).

As a result, without further information, the abstract query listed above may be transformed into an executable query that returns the names of the doctors administering tests having the specified results, rather than the patients undergoing the tests (as the user intended). Assume further that the corresponding data abstraction model also allows creating another executable query for the abstract query searching for names of doctors in the hospital having ordered the given blood test with the corresponding result value greater than 200. However, the result sets returned for both executable queries are different. In other words, in order to transform the abstract query into the executable query leading to the user's expected query result, the user's intention at the moment of creation of the abstract query must be taken into consideration.

One approach for dealing with this difficulty can be to create all executable queries which can be created for a given abstract query and to prompt a user to select a corresponding required executable query therefrom. This would, however, jeopardize the decoupling from the underlying physical data, as all executable queries are expressed with respect to an underlying physical data structure. Furthermore, this approach can be confusing for the user and require a deeper understanding of the underlying physical data structure as desired by the user.

Therefore, there is a need for an efficient technique for transforming an abstract query into an executable query when at least two different interpretations of the abstract query are possible.

SUMMARY OF THE INVENTION

The present invention is generally directed to a method, system and article of manufacture for managing data abstraction models and, more particularly, for managing relationships in a data abstraction model abstractly describing data in a database.

One embodiment provides a method of linking logical branches of data in a database. The method generally includes providing a structure with links between logical branches of the data abstraction model encompassing logical fields, some of which share a common name, wherein the links allow for the proper joining of data structures containing the physical fields when executing an abstract query containing a reference to a common name shared by multiple logical fields.

Another embodiment provides a method of creating queries querying physical data logically represented by a data abstraction model. The method includes receiving an abstract query against physical data in a database, the abstract query having one or more result fields. Each result field corresponds to a logical field specification of the data abstraction model. Then, it is determined whether the data abstraction model includes logical links associated with the abstract query. If the data abstraction model includes associated logical links, the associated logical links are retrieved and the abstract query is transformed into an executable query. The transforming is done using the data abstraction model and the retrieved associated logical links. The executable query is capable of being executed against the physical data.

Still another embodiment provides a method of linking logical fields of a data abstraction model abstractly describing data in a database. Each logical field defines a logical representation of a specific set of the data. The method includes generating a logical tree structure for the data abstraction model, the logical tree structure having a plurality of logical branches. Each logical branch includes one or more logical fields. Then, relationships between different logical branches are identified and logical links are generated. The logical links abstractly describe the identified relationships and are associated with the data abstraction model.

Still another embodiment provides a computer-readable medium containing a program which, when executed by a processor, performs a process of creating queries querying physical data logically represented by a data abstraction model. The process includes receiving an abstract query against physical data in a database. The abstract query has one or more result fields, each corresponding to a logical field specification of the data abstraction model. Then, it is determined whether the data abstraction model includes logical links associated with the abstract query. If the data abstraction model includes associated logical links, the associated logical links are retrieved. Then, the abstract query is transformed into an executable query capable of being executed against the physical data. The transforming is done using the data abstraction model and the retrieved associated logical links.

Still another embodiment provides a computer-readable medium containing a program which, when executed by a processor, performs a process for creating queries querying physical data logically represented by a data abstraction model. The process includes displaying a graphical user interface allowing a user to navigate through a logical tree structure representing the data abstraction model. The logical tree structure has a plurality of logical branches. At least two logical branches are linked by a logical link. Each logical branch includes one or more logical fields of the data abstraction model. Each logical field defines a logical representation of a specific set of the physical data.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
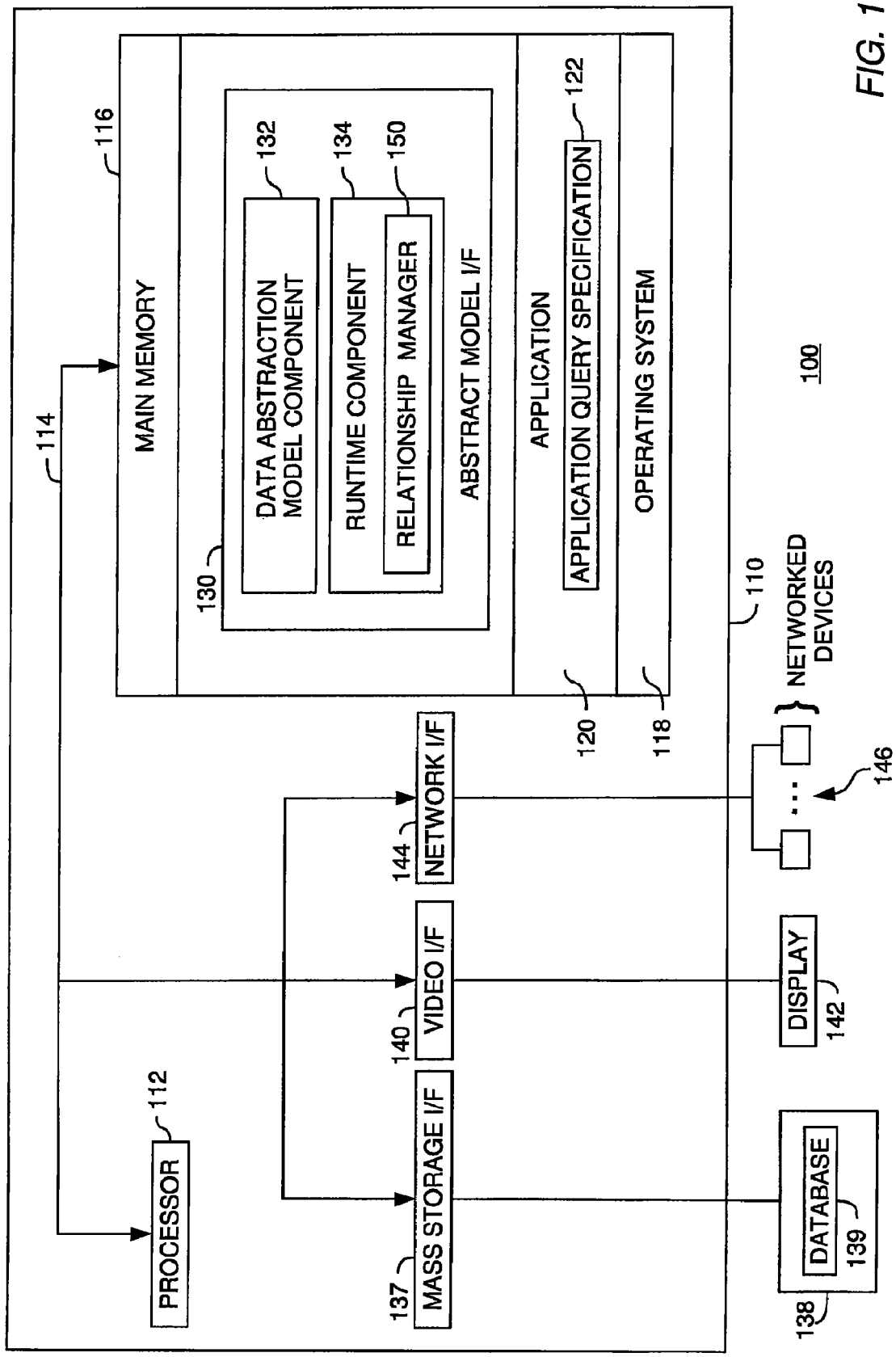
FIG. 1 is a computer system illustratively utilized in accordance with the invention.

Embodiments of the present invention generally provide a way to associate logical branches of data with other logical branches of data. In so doing, information about how to join tables together can be automatically gathered (e.g., without directly prompting a user for such information). For some embodiments, logical links between related logical branches may be created on the basis of identified relationships. These logical links may then be used to interpret abstract queries involving logical field names that may be interpreted differently. In other words, the logical links may be used to automatically determine an intent of a user creating the query.

According to one aspect, a data abstraction model abstractly describes data in a database. The data abstraction model can be represented by a logical tree structure having a plurality of logical branches. Each logical branch includes one or more logical fields. Each logical field defines a logical representation of a specific set of the data in the database. The data abstraction model provides for each logical field a logical field specification that defines the logical representation of the specific set of the data.

In one embodiment, logical branches of data in a database are linked. To this end, a data abstraction model defining a corresponding logical tree structure having a plurality of logical branches is accessed. Then, relationships between logical fields of different logical branches of the plurality of logical branches are identified. According to one aspect, a graphical representation of the corresponding logical tree structure can be generated and displayed to a user using a graphical user interface. Thus, the user can access the logical tree structure via the graphical user interface for identifying the relationships between the logical fields. On the basis of the identified relationships, logical links are created. The logical links abstractly describe the identified relationships. The created logical links are associated with the data abstraction model.

In one embodiment, an abstract query against data in one or more databases is created. As result field(s) for the abstract query, at least one logical field from a plurality of logical fields of a corresponding data abstraction model is selected. The result field(s) can be selected using a graphical user interface. According to one aspect, the graphical user interface can be configured to allow a user to navigate through a logical tree structure representing the data abstraction model. The logical tree structure may have a plurality of logical branches, wherein at least two logical branches are linked by a logical link. Upon selection of the result field(s), it is determined whether the corresponding data abstraction model includes logical links associated with the abstract query. If the data abstraction model includes associated logical links, the associated logical links are retrieved. Thus, when the abstract query is transformed into an executable query, the transforming can be performed using the data abstraction model and the retrieved associated logical links. The executable query is capable of being executed against the data in the database(s). Upon execution of the executable query against the database(s), data is returned for each result field.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

Referring now to FIG. 1, a computing environment 100 is shown. In general, the distributed environment 100 includes computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer computer available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 110. Examples of the operating system 118 include IBM OS/400®, UNIX, Microsoft Windows®, and the like.

The memory 116 further includes one or more applications 120 and an abstract model interface 130. The applications 120 and the abstract model interface 130 are software products comprising a plurality of instructions that are resident at various times in various memory and storage devices in the computer system 110. When read and executed by one or more processors 112 in the computer system 110, the applications 120 and the abstract model interface 130 cause the computer system 110 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation of the data. A physical representation of data defines an organizational schema of the data. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract model interface 130. A logical field defines an abstract view of data whether as an individual data item or a data structure in the form of, for example, a database table. In particular, the logical fields used in the abstract queries are defined by a data abstraction model component 132 of the abstract model interface 130. In one embodiment, the data abstraction model component 132 includes logical links which are created and managed by a relationship manager 150. The logical links describe relationships between logical branches of data in the database 139. Operation and interaction of the data abstraction model 132 and the relationship manager 150 are further described below with reference to FIGS. 2-3.

Illustratively, the relationship manager 150 is shown as part of a runtime component 134. The runtime component 134 transforms the abstract queries into concrete queries having a form consistent with the physical representation of the data contained in the database 139. Specifically, the runtime component 134 can use the logical links included with the data abstraction model 132 in the transformation of the abstract queries into the concrete queries. The concrete queries can be executed by the runtime component 134 against the database 139. Operation of the runtime component 134 is further described below with reference to FIG. 2.

An Exemplary Query Execution Runtime Environment

Figure 2:
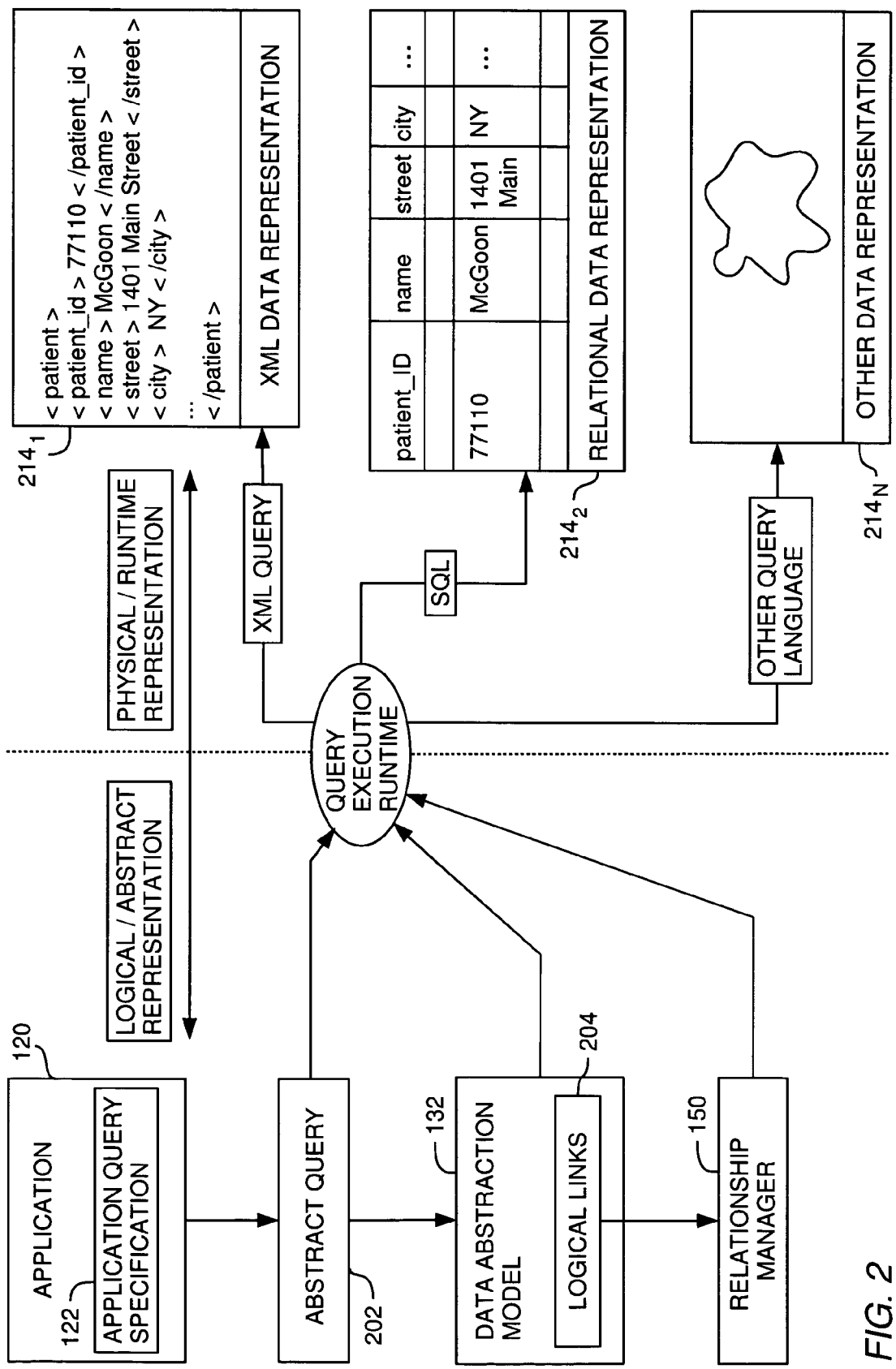
FIGS. 2-3B are relational views of software components for abstract query management.

Referring now to FIG. 2, a relational view illustrating interaction of the runtime component 134, the application 120, the data abstraction model 132 and the relationship manager 150 at query execution runtime is shown. The data abstraction model 132 is also referred to herein as a "logical representation" because the data abstraction model 132 defines logical fields corresponding to data structures in a database (e.g., database 139), thereby providing an abstract, i.e., a logical view of the data in the database 139. A data structure is a physical arrangement of the data, such as an arrangement in the form of a database table or a column of the database table. More specifically, each logical field defines a logical representation of a specific set of the data in the database 139. In a relational database environment having a multiplicity of database tables, a specific logical representation having specific logical fields can be provided for each database table. In this case, all specific logical representations together constitute the data abstraction model 132. Physical entities of the data are arranged in the database 139 according to a physical representation of the data. A physical entity of data (interchangeably referred to as a physical data entity) is a data item in an underlying physical representation. Accordingly, a physical data entity is the data included in a database table or in a column of the database table, i.e., the data itself. By way of illustration, two physical representations are shown, an XML data representation $214_1$ and a relational data representation $214_2$. However, the physical representation $214_N$ indicates that any other physical representation, known or unknown, is contemplated. In one embodiment, a different single data abstraction model 132 is provided for each separate physical representation 214, as explained above for the case of a relational database environment. In an alternative embodiment, a single data abstraction model 132 contains field specifications (with associated access methods) for two or more physical representations 214. A field specification is a description of a logical field and generally comprises a mapping rule that maps the logical field to a data structure(s) of a particular physical representation.

Figure 3A:
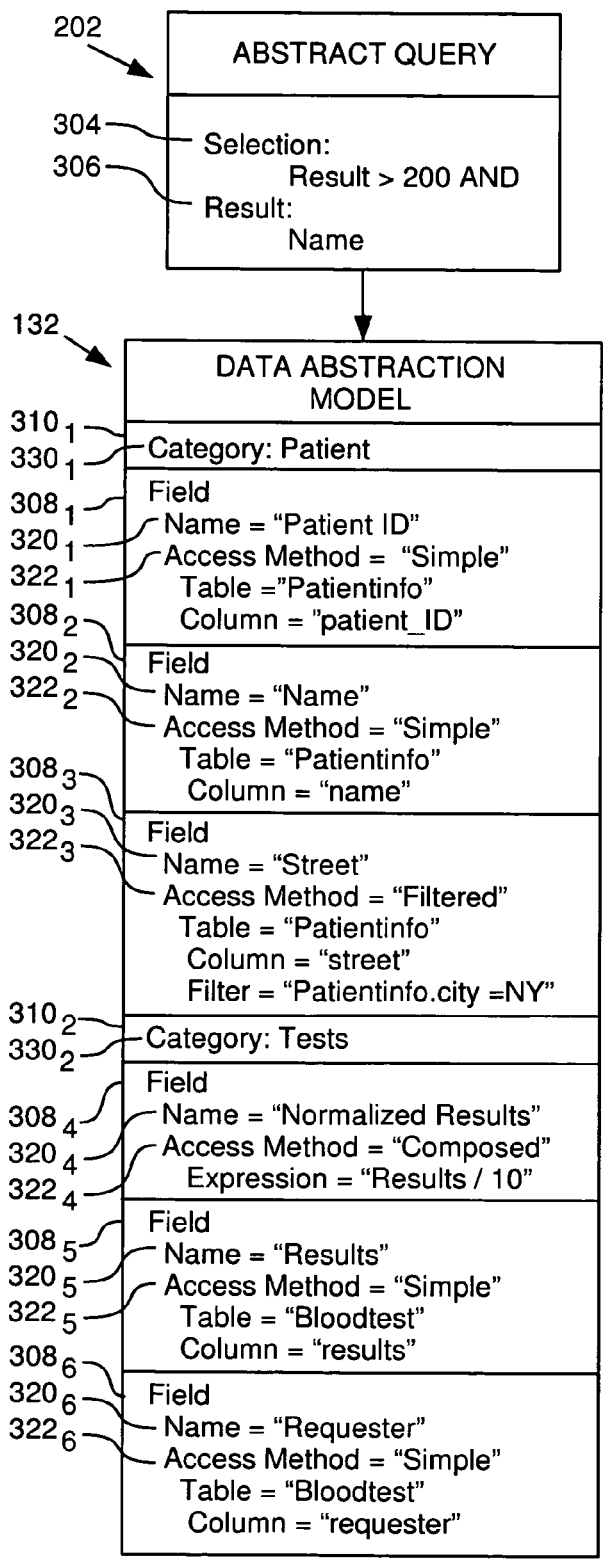

Using a logical representation of the data, the application query specification 122 specifies one or more logical fields to compose a resulting query 202. A requesting entity (e.g., the application 120) issues the resulting query 202 as defined by an application query specification of the requesting entity. In one embodiment, the abstract query 202 may include both criteria used for data selection and an explicit specification of result fields to be returned based on the data selection criteria. An example of the selection criteria and the result field specification of the abstract query 202 is shown in FIG. 3A. Accordingly, the abstract query 202 illustratively includes selection criteria 304 and a result field specification 306.

The resulting query 202 is generally referred to herein as an "abstract query" because the query is composed according to abstract (i.e., logical) fields rather than by direct reference to the underlying data structures in the database 139. As a result, abstract queries may be defined that are independent of the particular underlying physical data representation used. For execution, the abstract query is transformed into a concrete query consistent with the underlying physical representation of the data using the data abstraction model 132. The concrete query is executable against the database 139. An exemplary method for transforming the abstract query into a concrete query is described below with reference to FIGS. 4-5.

Figure 8A:
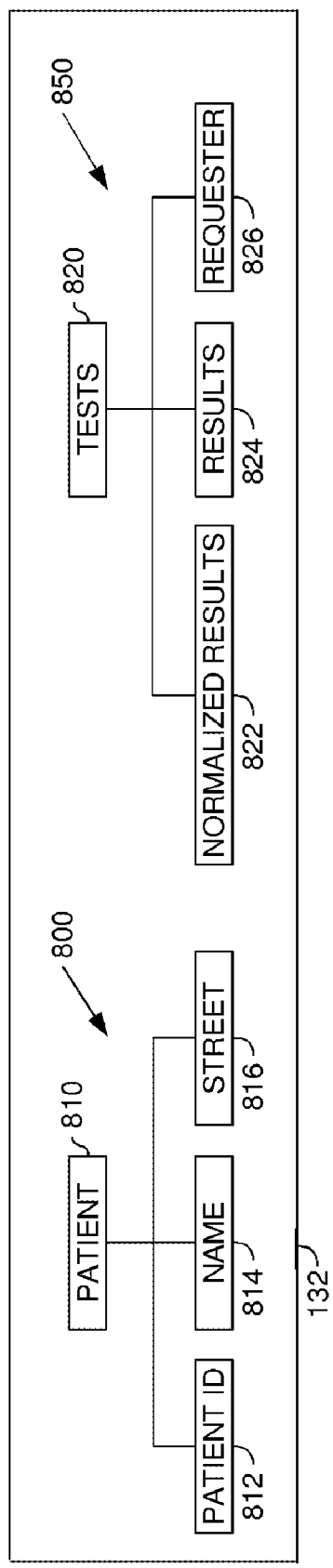
FIGS. 8A-D are tree structures illustrating linked logical branches in one embodiment.

In general, the data abstraction model 132 exposes information as a set of logical fields. According to one aspect, the data abstraction model 132 can be represented as a logical tree structure having a plurality of logical branches. Each logical branch may include one or more logical fields. Two exemplary logical branches of an illustrative logical tree structure are shown in FIG. 8A. In one embodiment, the logical fields may be used within an abstract query to specify criteria for data selection and specify the form of result data returned from a query operation. The logical fields are defined independently of the underlying physical representation being used in the database 139, thereby allowing abstract queries to be formed that are loosely coupled to the underlying physical representation.

Illustratively, the data abstraction model 132 includes logical links 204. The logical links 204 abstractly describe relationships between different logical branches of the logical tree structure representing the data abstraction model 132. If more than one data abstraction model is provided, the logical links 204 may describe relationships between logical branches of different data abstraction models. Using the relationship manager 150, the logical links 204 can be accessed in the transformation of the abstract query 202 into the concrete query to determine the relationships. Using the determined relationships, a path between different data structures of a physical representation of the data in the database 139 can be identified for the concrete query. For instance, assume that the concrete query is a SQL query, the physical representation of the database is a relational schema and the data structures are database tables. In this example, a JOIN statement can be created for the SQL query on the basis of the logical links 204 to specify a link between corresponding database tables in the SQL query. This link is applied when querying the data in the database 139 according to the SQL query for determining a corresponding query result.

An Exemplary Data Abstraction Model

Referring now to FIG. 3A, a relational view illustrating interaction of the abstract query 202 and the data abstraction model 132 is shown. In one embodiment, the data abstraction model 132 comprises a plurality of field specifications $308_1$, $308_2$, $308_3$, $308_4$, $308_5$ and $308_6$ (six shown by way of example), collectively referred to as the field specifications 308. Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$, $320_6$ (collectively, field name 320) and an associated access method attribute $322_1$, $322_2$, $322_3$, $322_4$, $322_5$, $322_6$ (collectively, access methods 322). Each attribute may have a value. For example, logical field name attribute $320_1$ has the value "Patient ID" and access method attribute $322_1$ has the value "Simple". Furthermore, each attribute may include one or more associated abstract properties. Each abstract property describes a characteristic of a data structure and has an associated value. As indicated above, a data structure refers to a part of the underlying physical representation that is defined by one or more physical entities of the data corresponding to the logical field. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "Patientinfo" and data location metadata "Column" has the value "patient_ID". Accordingly, assuming an underlying relational database schema in the present example, the values of data location metadata "Table" and "Column" point to a table "Patientinfo" having a column "patient_ID".

In one embodiment, groups (i.e. two or more) of logical fields may be part of categories. Accordingly, the data abstraction model 132 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-6}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Patient" category and logical fields $308_{4-6}$ are part of the "Tests" category.

The access methods 322 generally associate (i.e., map) the logical field names to data in the database (e.g., database 139 of FIG. 1). Any number of access methods is contemplated depending upon the number of different types of logical fields to be supported. In one embodiment, access methods for simple fields, filtered fields and composed fields are provided. The field specifications $308_1$, $308_2$, $308_5$ and $308_6$ exemplify simple field access methods $322_1$, $322_2$, $322_5$ and $322_6$, respectively. Simple fields are mapped directly to a particular data structure in the underlying physical representation (e.g., a field mapped to a given database table and column). By way of illustration, as described above, the simple field access method $322_1$ maps the logical field name $320_1$ ("Patient ID") to a column named "patient_ID" in a table named "Patientinfo". The field specification $308_3$ exemplifies a filtered field access method $322_3$. Filtered fields identify an associated data structure and provide filters used to define a particular subset of items within the physical representation. An example is provided in FIG. 3A in which the filtered field access method $322_3$ maps the logical field name $320_3$ ("Street") to data in a column named "street" in a table named "Patientinfo" and defines a filter for individuals in the city of "NY". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more data structures using an expression supplied as part of the access method definition. In this way, information which does not exist in the underlying physical data representation may be computed. In the example illustrated in FIG. 3A the composed field access method $322_4$ maps the logical field name $320_4$ "Normalized Results" to "Results/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 132 shown in FIG. 3A are representative of logical fields mapped to data represented in the relational data representation $214_2$ shown in FIG. 2. However, other instances of the data abstraction model 132 map logical fields to other physical representations, such as XML.

An illustrative abstract query corresponding to the abstract query 202 shown in FIG. 3A is shown in Table I below. By way of illustration, the illustrative abstract query is defined using XML. However, any other language may be used to advantage.

TABLE I

ABSTRACT QUERY EXAMPLE

| |  |
|---|---|
| 001 | <?xml version="1.0"?> |
| 002 | <!--Query string representation: (Result > "200"--> |
| 003 | <QueryAbstraction> |
| 004 |    <Selection> |
| 005 |       <Condition internalID="4"> |
| 006 |          <Condition field="Results" operator="GT" value="200" |
| 007 |             internalID="1"/> |
| 008 |    </Selection> |
| 009 |    <Results> |
| 010 |       <Field name="Name"/> |
| 011 |    </Results> |
| 012 | </QueryAbstraction> |

Illustratively, the abstract query shown in Table I includes a selection specification (lines 004-008) containing selection criteria and a result specification (lines 009-011). In one embodiment, a selection criterion (hereinafter also referred to as "search criterion") consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data abstraction model (DAM) corresponding to the data abstraction model 132 shown in FIG. 3A is shown in Table II below. By way of illustration, the illustrative data abstraction model is defined using XML. However, any other language may be used to advantage.

TABLE II

DATA ABSTRACTION MODEL EXAMPLE

```
001    <?xml version="1.0"?>
002    <DataAbstraction>
003        <Category name="Patient">
004            <Field queryable="Yes" name="Patient ID" displayable=
               "Yes">
005                <AccessMethod>
006                    <Simple columnName="patient_ID"
tableName="Patientinfo"></Simple>
007                </AccessMethod>
008            </Field>
009            <Field queryable="Yes" name="Name" displayable="Yes">
010                <AccessMethod>
011                    <Simple columnName="name" tableName=
                       "Patientinfo"></Simple>
012                </AccessMethod>
013            </Field>
014            <Field queryable="Yes" name="Street" displayable="Yes">
015                <AccessMethod>
016                    <Filter columnName="street" tableName=
                       "Patientinfo">
017                    </Filter="Patientinfo.city=NY">
018                </AccessMethod>
019            </Field>
020        </Category>
021        <Category name="Tests">
022            <Field queryable="Yes" name="Normalized Results"
               displayable="Yes">
023                <AccessMethod>
024                    <Composed columnName="results" tableName=
                       "Bloodtest">
025                    </Composed Expression="Results/10">
026                </AccessMethod>
027            </Field>
028            <Field queryable="Yes" name="Results" displayable="Yes">
029                <AccessMethod>
030                    <Simple columnName="results" tableName=
                       "Bloodtest"></Simple>
031                </AccessMethod>
032            </Field>
033            <Field queryable="Yes" name="Requester" displayable=
               "Yes">
034                <AccessMethod>
035                    <Simple columnName="requester"
tableName="Bloodtest"></Simple>
036                </AccessMethod>
037            </Field>
038        </Category>
039    </DataAbstraction>
```

By way of example, note that lines 004-008 correspond to the first field specification $308_1$ of the DAM 132 shown in FIG. 3A and lines 009-013 correspond to the second field specification $308_2$.

According to one aspect, the data abstraction model 132 may include logical links (e.g., logical links 204 of FIG. 2). More specifically, each of the field specifications 308 of the data abstraction model 132 may include associated logical links. Furthermore, each category of the data abstraction model 132 may include associated logical links. An exemplary data abstraction model including logical links is described below with reference to FIG. 3B.

An Exemplary Data Abstraction Model Having Logical Links

Figure 3B:
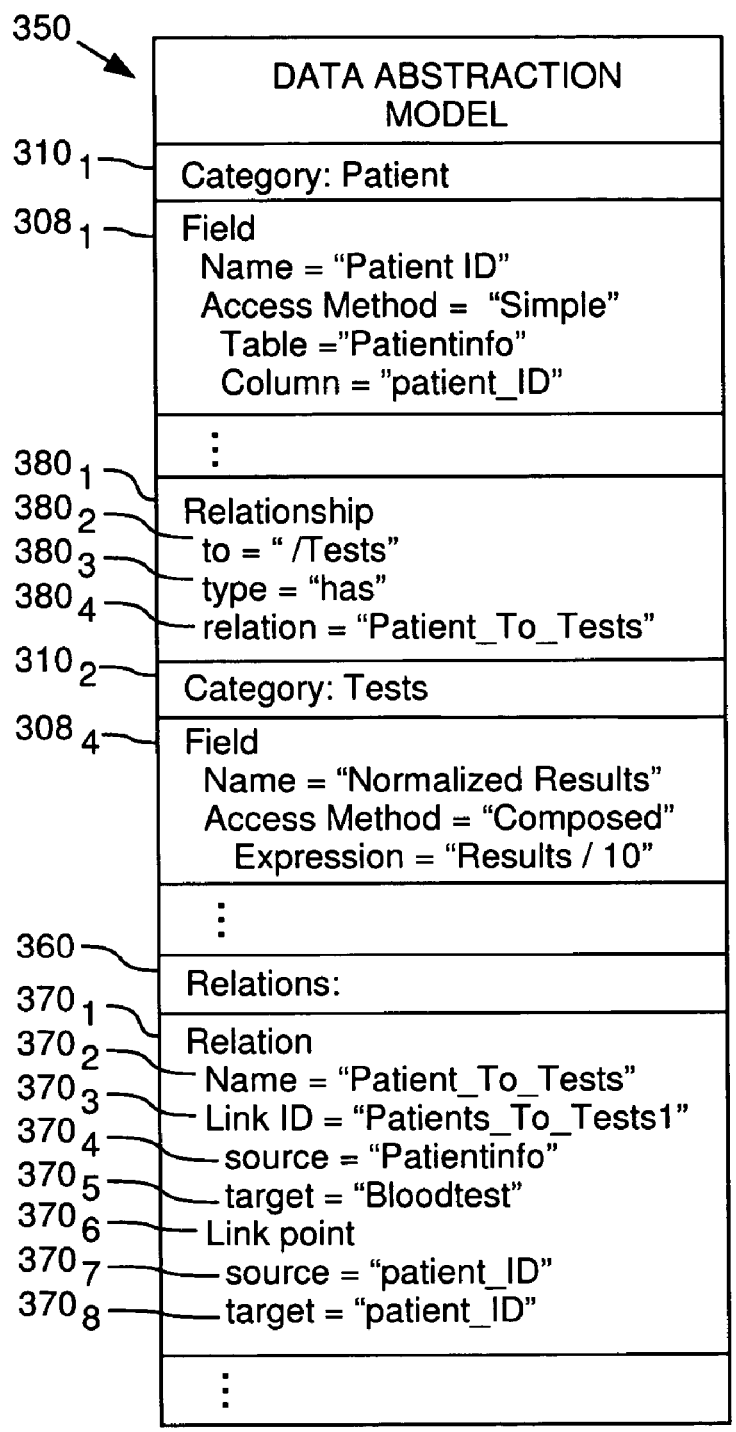

As previously described, logical links created based on relationships between logical fields may be used to resolve ambiguous field name references in abstract queries. Referring now to FIG. 3B, one embodiment of a data abstraction model 350 containing an exemplary logical link is shown. The data abstraction model 350 corresponds to the data abstraction model 132 of FIG. 3A to which the exemplary logical link has been added. For brevity, only the field specifications $308_1$ and $308_4$ of the categories $310_1$ and $310_2$ of the data abstraction model 132 of FIG. 3A are shown in the data abstraction model 350. Furthermore, the data abstraction model 350 includes an exemplary relations section 360 that has been added to the data abstraction model 132 of FIG. 3A. Illustratively, the logical link is composed of a link specification $380_1$ and a link definition $370_1$. By way of example, the link specification $380_1$ has been added to the category $310_1$ of the data abstraction model 132 of FIG. 3A. The link definition $370_1$ is included with the relations section 360. More generally, a relations section may include one or more link definitions.

In one embodiment, a link specification identifies a relationship between different logical branches of data and may contain a plurality of attributes. Each attribute may have a value. In one embodiment, each link specification includes a linked branch attribute, a link type attribute and a link name attribute. The linked branch attribute has a value that identifies a logical branch which is linked to the logical branch that includes the link specification. For example, the link specification $380_1$ in the category "Patient" $310_1$ includes a linked branch attribute "to" $380_2$ having a value "/Tests". The value "/Tests" indicates that the category "Patient" $310_1$ is related to a logical branch represented by the category "Tests" $310_2$. The link type attribute has a value that indicates a type of the relationship. For example, the link specification $380_1$ includes a link type attribute "type" $380_3$ having a value "has". More specifically, the value "has" indicates that each patient which is abstractly described by logical fields of the category "Patient" $310_1$ has one or more associated tests which are abstractly described by logical fields of the category "Tests" $310_2$. In other words, in the given example each logical field of any of both categories $310_1$ and $310_2$ contains information with respect to a given patient. However, it should be noted that the "has" value has merely been illustrated by way of example and that various other values of link type attributes are contemplated. For instance, a "is_a" value can be implemented for indicating that a given logical field can be described using information of other logical fields of a corresponding linked logical branch The link name attribute has a value that identifies the logical link. For example, the link specification $380_1$ includes a link name attribute "relation" $380_4$ having a value "Patient_To_Tests". In other words, the logical link having the link specification $380_1$ has the name "Patient_To_Tests".

In one embodiment, the link definition $370_1$ abstractly describes the relationship identified by the link specification $380_1$. Therefore, the link definition $370_1$ may contain a plurality of attributes. Each attribute may have a value. Furthermore, each attribute may have one or more abstract properties. According to one aspect, each link definition includes a name attribute, at least one link ID attribute and at least one link point attribute. The name attribute has a value that characterizes the logical link. The name attribute value generally corresponds to the value of a link name attribute of a corresponding link specification. By way of example, the link definition $370_1$ includes a name attribute "Name" $370_2$ having a value "Patient_To_Tests" which corresponds to the value of the link name attribute "relation" $380_4$ of the link specification $380_1$. Each link ID attribute has a value that uniquely identifies at least one segment of the logical link. For example, the logical link may describe a path between a database table 1 and a database table 3 via a database table 2. In this case, the logical link may include two segments: (i) a first segment that abstractly describes the relationship between database tables 1 and 2, and (ii) a second segment that abstractly describes the relationship between database tables 2 and 3. Accordingly, the first segment can be uniquely identified by a first link ID attribute and the second segment can be identified by a second link ID attribute. In the example illustrated in FIG. 3B, the link definition $370_1$ includes a single link ID attribute "Link ID" $370_3$ having a value "Patients_To_Tests1". The link ID attribute "Link ID" $370_3$ illustratively includes two abstract properties identifying linked physical data structures, like tables in the database 139 of FIG. 1. Illustratively, the link ID attribute "Link ID" $370_3$ includes abstract properties "source" $370_4$ and "target" $370_5$. The abstract property $370_4$ "source" has the value "Patientinfo" and the abstract property "target" $370_5$ has the value "Bloodtest". In other words, the logical link "Patient_To_Tests" abstractly describes a relationship between the database tables "Patientinfo" and "Bloodtest". Each link point attribute includes two abstract properties identifying link points in the linked physical data structures, like columns of database tables. Illustratively, the link point attribute "Link point" $370_6$ includes abstract properties "source" $370_7$ and "target" $370_8$. The abstract property "source" $370_7$ has the value "patient_ID" and the abstract property "target" $370_8$ has also the value "patient_ID". In other words, the database tables "Patientinfo" and "Bloodtest" are linked via respective "patient_ID" columns contained in both tables.

Exemplary database tables "Patientinfo" and "Bloodtest" are shown in Tables III and IV below. For simplicity and brevity, only column names and data types are indicated for the exemplary database tables illustrated in Tables III and IV. However, it should be assumed that the corresponding database tables are populated with queryable data.

TABLE III

EXEMPLARY DATABASE TABLE "PATIENTINFO"

| 001 | patient_ID | int |
| 002 | name | varchar |
| 003 | street | varchar |

TABLE IV

EXEMPLARY DATABASE TABLE "BLOODTEST"

| 001 | test_num | int |
| 002 | patient_ID | int |
| 003 | results | float |
| 004 | requester | int |

As can be seen from Table III, the "Patientinfo" table illustratively contains name ("name") and address ("street") information about each patient. Furthermore, each patient in the "Patientinfo" table is uniquely identified by a "patient_ID" identifier. The "Bloodtest" table illustratively contains information about results ("results") of blood tests performed on patients ("patient_ID"), which have been requested by a given doctor ("requester") in a hospital. Each blood test result is uniquely identified by a "test_num" identifier.

An illustrative data abstraction model (DAM) corresponding to the data abstraction model 350 shown in FIG. 3B including all field specifications of the data abstraction model of Table II is shown in Table V below. By way of illustration, the illustrative data abstraction model is defined using XML. However, any other language may be used to advantage.

TABLE V

DATA ABSTRACTION MODEL EXAMPLE

```
001    <?xml version="1.0"?>
002    <DataAbstraction>
003        <Category name="Patient">
004            <Field queryable="Yes" name="Patient ID" displayable=
               "Yes">
005                <AccessMethod>
006                    <Simple columnName="patient_ID"
       tableName="Patientinfo"></Simple>
007                </AccessMethod>
008            </Field>
009            <Field queryable="Yes" name="Name" displayable=
               "Yes">
010                <AccessMethod>
011                    <Simple columnName="name" tableName=
                       "Patientinfo"></Simple>
012                </AccessMethod>
013            </Field>
014            <Field queryable="Yes" name="Street" displayable=
               "Yes">
015                <AccessMethod>
016                    <Filter columnName="street" tableName=
                       "Patientinfo">
017                    </Filter="Patientinfo.city=NY">
018                </AccessMethod>
019            </Field>
020            <Relationship to="/Tests" type="has" relation=
               "Patient_To_Tests"/>
021        </Category>
022        <Category name="Tests">
023            <Field queryable="Yes" name="Normalized Results"
               displayable="Yes">
024                <AccessMethod>
025                    <Composed columnName="results"
                       tableName="Bloodtest">
026                    </Composed Expression="Results/10">
027                </AccessMethod>
028            </Field>
029            <Field queryable="Yes" name="Results" displayable=
               "Yes">
030                <AccessMethod>
031                    <Simple columnName="results" tableName=
                       "Bloodtest"></Simple>
032                </AccessMethod>
033            </Field>
034            <Field queryable="Yes" name="Requester" displayable=
               "Yes">
035                <AccessMethod>
036                    <Simple columnName="requester"
       tableName="Bloodtest"></Simple>
037                </AccessMethod>
038                <Relationship
039                    to="/Patient" type="is_a" relation=
                       "Requester_To_Patient" />
040            </Field>
041        </Category>
042        <Relations>
043            <Relation name="Patient_To_Tests">
044                <Link id="Patient_To_Tests1"
045                    source="Patientinfo" target="Bloodtest"
                       type="left">
046                    <LinkPoint source="patient_ID"
                       target="patient_ID" />
047                </Link>
048            </Relation>
049            <Relation name="Requester_To_Patient">
050                <Link id="Requester_To_Patient1"
051                    source="Bloodtest" target="Employeeinfo"
```

TABLE V-continued

DATA ABSTRACTION MODEL EXAMPLE

```
              type"left">
052             <LinkPoint source="requester" target=
                  "employeenum" />
053           </Link>
054           <Link id="Requester_To_Patient2"
055             source="Employeeinfo" target="Patientinfo"
                type="left">
056             <LinkPoint source="patient_ID" target=
                  "patient_ID" />
057           </Link>
058         </Relation>
059       </Relations>
060    </DataAbstraction>
```

It should be noted that lines 042-059 correspond to the relations section 360 shown in FIG. 3B. By way of example, note that line 020 corresponds to the link specification 380$_1$ shown in FIG. 3B and that lines 043-048 correspond to the link definition 370$_1$. Furthermore, lines 049-058 include another link definition for a logical link which is specified by a link specification in lines 038-039. Specifically, the link definition in lines 049-058 indicates that the database table "Bloodtest" is linked to another database table "Employeeinfo" via the "requester" column contained in the "Bloodtest" table and an "employeenum" column in the "Employeeinfo" table (lines 051-052). The link definition in lines 049-058 further indicates that the database table "Employeeinfo" is linked to the "Patientinfo" database table via respective "patient_ID" columns contained in both tables (lines 055-056). A corresponding exemplary "Employeeinfo" database table is shown in Table VI below. For simplicity and brevity, only column names and data types are indicated for the exemplary database table illustrated in Table VI. However, it should be assumed that the corresponding database table is populated with queryable data.

TABLE VI

EXEMPLARY DATABASE TABLE "EMPLOYEEINFO"

| 001 | employeenum | int |
|---|---|---|
| 002 | patient_ID | int |

As was noted above, the abstract query of Table I can be transformed into a concrete query for query execution. An exemplary method for transforming an abstract query into a concrete query is described below with reference to FIGS. 4-5.

Transforming an Abstract Query into a Concrete Query

Figure 4:
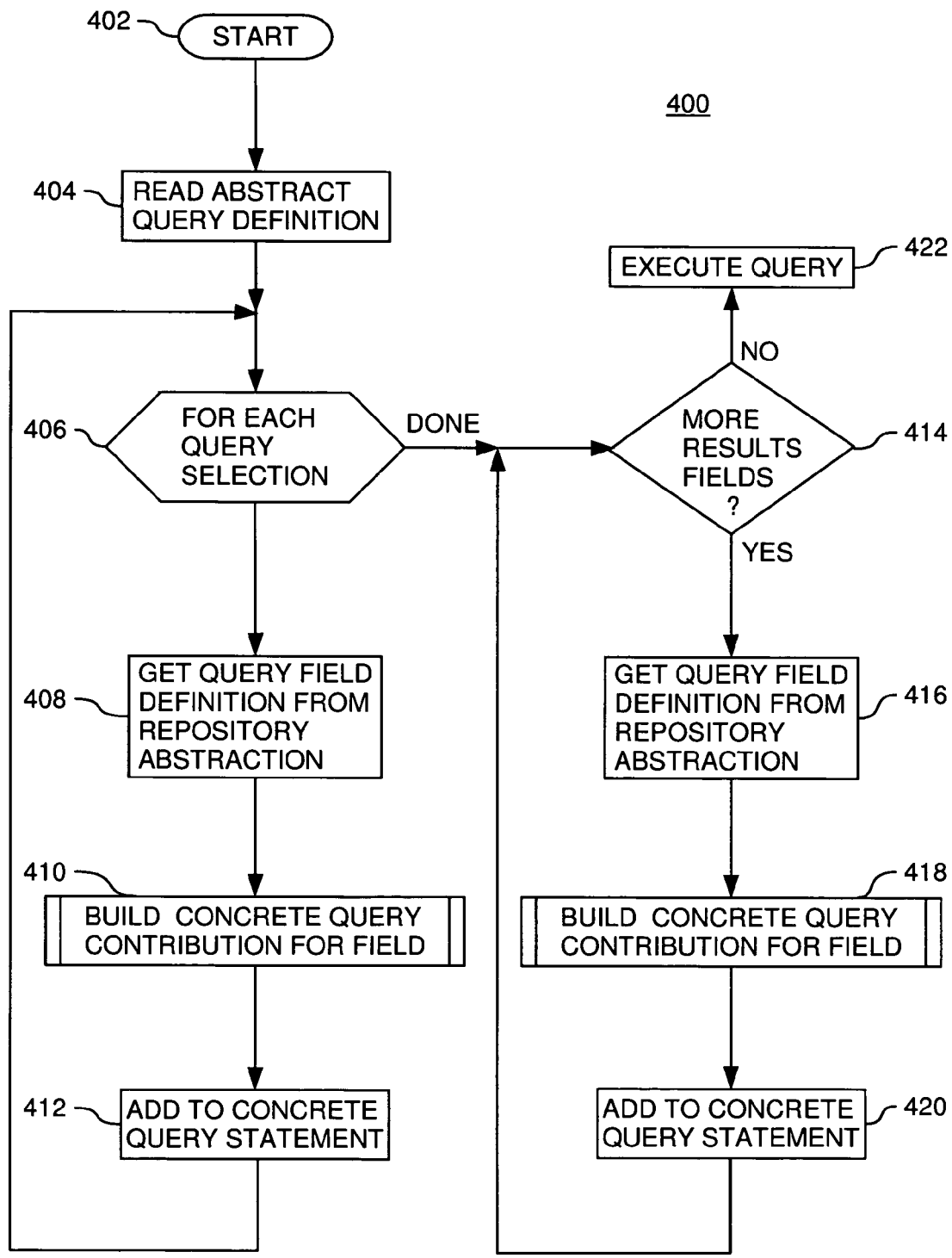
FIGS. 4-5 are flow charts illustrating the operation of a runtime component.

Referring now to FIG. 4, an illustrative runtime method 400 exemplifying one embodiment of the operation of the runtime component 134 of FIG. 1 is shown. The method 400 is entered at step 402 when the runtime component 134 receives as input an abstract query (such as the abstract query shown in Table I). At step 404, the runtime component 134 reads and parses the abstract query and locates individual selection criteria and desired result fields. At step 406, the runtime component 134 enters a loop (comprising steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 134 uses the field name from a selection criterion of the abstract query to look up the definition of the field in the data abstraction model 132. As noted above, the field definition includes a definition of the access method used to access the data structure associated with the field. The runtime component 134 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of result fields, i.e., a list of logical fields that are to be returned as a result of query execution, referred to herein as a result specification. A result specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 134 looks up a result field name (from the result specification of the abstract query) in the data abstraction model 132 and then retrieves a result field definition from the data abstraction model 132 to identify the physical location of data to be returned for the current logical result field. The runtime component 134 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

One embodiment of a method 500 for building a concrete query contribution for a logical field according to steps 410 and 418 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for a given data structure(s). At step 510, the concrete query contribution is extended with additional logic (filter selection) used to subset data associated with the given data structure(s). Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access method types contemplated as embodiments of the present invention. However, it should be understood that embodiments are contemplated in which less then all the available access methods are implemented. For example, in a particular embodiment only simple access methods are used. In another embodiment, only simple access methods and filtered access methods are used.

As was noted above, a data abstraction model may include logical links that can be created and managed using a relationship manager (e.g., relationship manager 150 of FIG. 1). The logical links abstractly describe relationships between different logical branches of a logical tree structure representing the data abstraction model. Operation of a relationship manager for creating logical links in one embodiment is described below with reference to FIG. 6.

Creating Logical Links Based on Relationships

Figure 6:
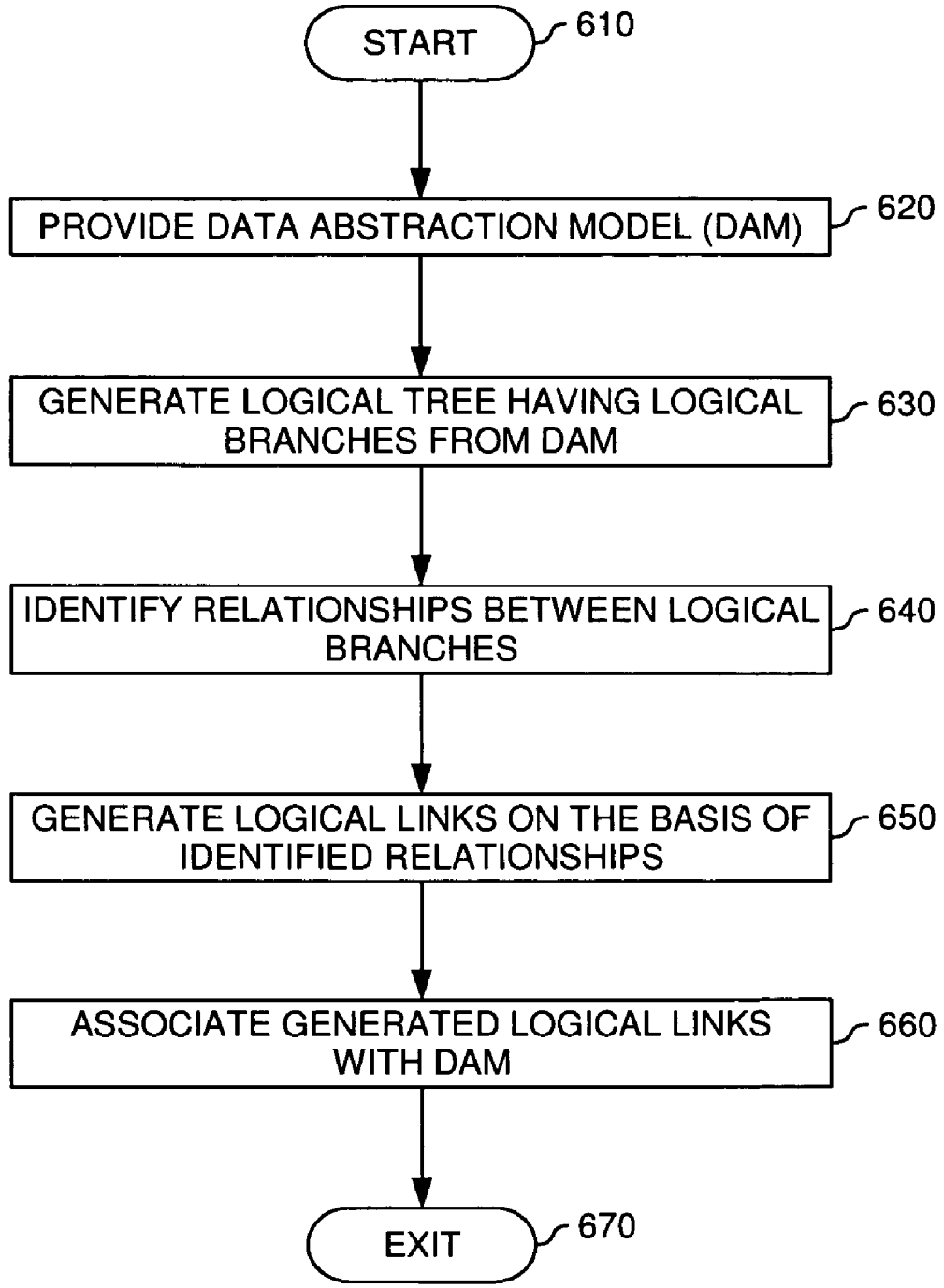
FIG. 6 is a flow chart illustrating relationship management in a data abstraction model in one embodiment.

Referring now to FIG. 6, an exemplary method 600 for creating logical links (e.g., logical links 204 of FIG. 2) is illustrated. In one embodiment, method 600 is performed by a relationship manager (e.g., relationship manager 150 of FIG. 1). Method 600 starts at step 610.

At step 620, a data abstraction model (e.g., data abstraction model 132 of FIG. 1) is provided. By way of example, providing the data abstraction model includes retrieving the data abstraction model from memory (e.g., main memory 116 of FIG. 1). Providing the data abstraction model further includes creating the data abstraction model at runtime. At step 630, a logical tree structure is generated for the provided data abstraction model. The logical tree structure includes a plurality of logical branches and represents the data abstraction model. Each logical branch may include one or more logical fields from the data abstraction model. An exemplary logical tree structure having two illustrative logical branches is explained below with reference to FIG. 8A.

At step 640, relationships between different logical branches of the plurality of logical branches are identified. In one embodiment, the relationships between the different logical branches are identified by a user. For instance, the user can identify the relationships on the basis of the user's knowledge of relations between underlying physical data structures. According to one aspect, this knowledge of the user can be based on an analysis that is performed on the underlying physical data structures prior to step 620 or 630.

It should be noted that reference is made to relationships between logical fields in different logical branches. However, other relationships can be identified for generation of logical links. For instance, relationships between a patent category and a child field, e.g., logical fields in a same logical branch, may also be used in generation of logical links. Accordingly, it is understood that generating logical links on the basis of relationships between different logical branches is merely described by way of example. However, generating logical links on the basis of any suitable relationships is broadly contemplated.

At step 650, one or more logical links are generated on the basis of the identified relationships. In one embodiment, generating the logical link(s) includes creating the logical link(s) at runtime. For instance, a user may edit a link specification (e.g., link specification $380_1$ of FIG. 3B) and a link definition (e.g., link definition $370_1$ of FIG. 3B) for each logical link using a suitable user interface. However, it should be noted that any suitable technique for generating the logical link(s) is contemplated, including fully automated generation processes.

At step 660, the generated logical links are associated with the data abstraction model. For instance, the generated logical fields can be included with the data abstraction model to create such an association. More specifically, the data abstraction model can be edited by the user using a suitable user interface to insert the logical link(s) therein, as described above with reference to Table V. However, it should be noted that alternatively one or more references to the generated logical links can be included with the data abstraction model. Accordingly, the generated logical links can be stored as a persistent data object(s) separate from the data abstraction model. In other words, the generated logical links can be associated with the data abstraction model in various different ways, which are all broadly contemplated. Method 600 then exits at step 670.

As was noted above, the logical links can be used in transformation of abstract queries into concrete queries. Transforming an abstract query using logical links is described in more detail below with reference to FIG. 7.

Using Logical Links in Query Transformation

Figure 7:
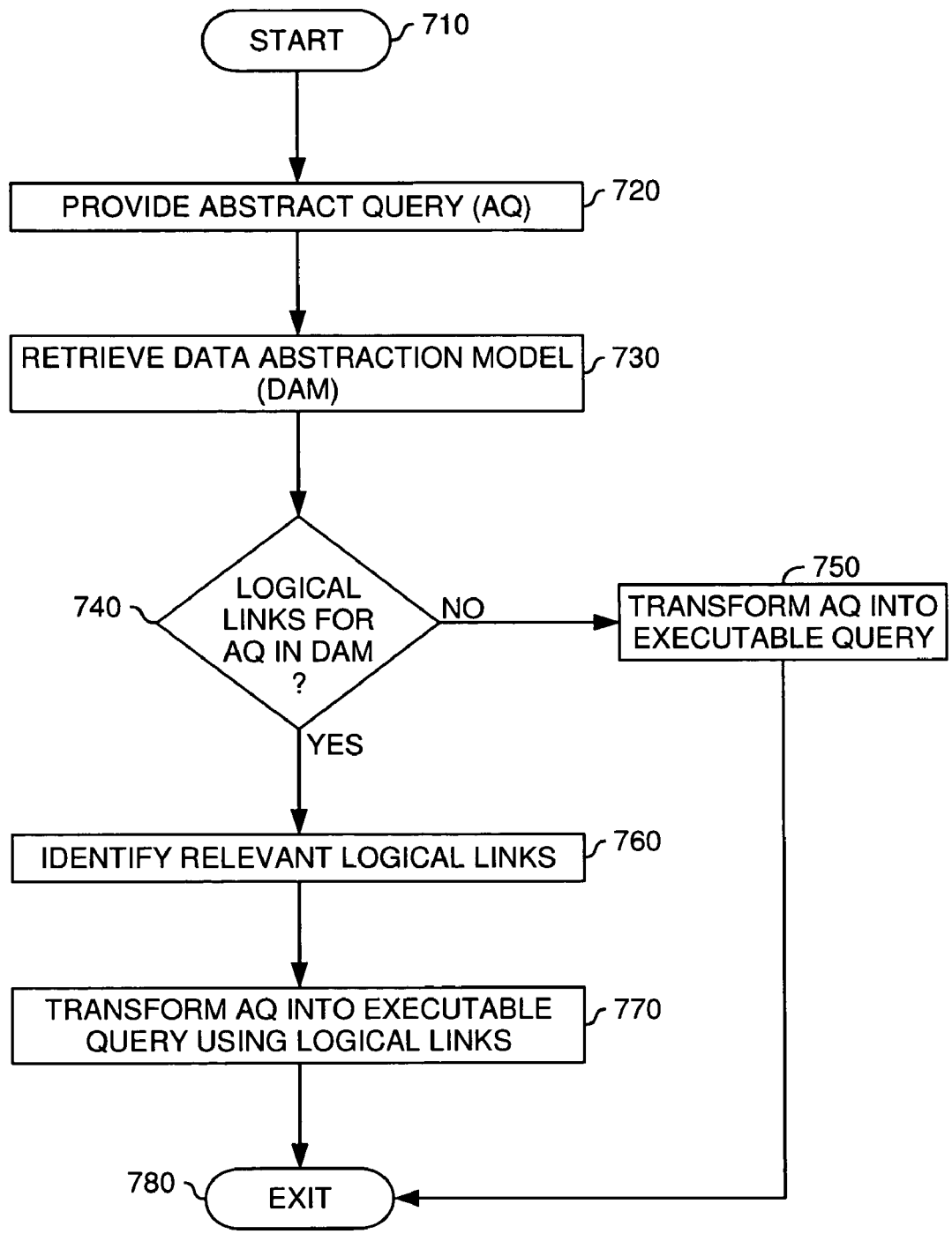
FIG. 7 is a flow chart illustrating application of relationship management in a data abstraction model for creation of abstract queries in one embodiment.

Referring now to FIG. 7, an exemplary method 700 for transforming an abstract query (e.g., abstract query 202 of FIG. 2) into a concrete query using logical links (e.g., logical links 204 of FIG. 2) is illustrated. In one embodiment, method 700 is performed by a relationship manager (e.g., relationship manager 150 of FIG. 1). Method 700 starts at step 710.

At step 720, an abstract query is provided. The provided abstract query may include one or more result fields and one or more selection criteria. In one embodiment, providing the abstract query includes retrieving the abstract query from memory (e.g., main memory 116 or database 139 of FIG. 1). In another embodiment, providing the abstract query includes creating the abstract query at runtime. For instance, a user may use a suitable user interface for selecting logical fields from a corresponding data abstraction model (e.g., data abstraction model 132 of FIG. 1) as result field specification (e.g., result field specification 306 of FIG. 3A) for the abstract query. The user may further use a suitable user interface for specification of desired selection criteria (e.g., selection criteria 304 of FIG. 3A) for the abstract query. An exemplary user interface which allows user specification of desired selection criteria is described below with reference to FIGS. 9A-B.

An illustrative abstract query as an example for the provided abstract query is shown in Table VII below. For brevity and simplicity, the illustrative abstract query is defined as a worded request for retrieving names of doctors (requesters) in a hospital having ordered a given blood test with a result value greater than 200.

TABLE VII

ABSTRACT QUERY EXAMPLE

| | |
|---|---|
| 001 | FIND |
| 002 | /Patient/Tests/Requester/Name |
| 003 | WHERE |
| 004 | /Patient/Tests/Results > 200 |

At step 730, a data abstraction model that corresponds to the provided abstract query is retrieved. In the given example, the data abstraction model of Table V is retrieved. At step 740, a verification is performed for determining whether the retrieved data abstraction model includes logical links which are relevant to the abstract query. More specifically, as was noted above, the abstract query is composed according to logical fields. In other words, the result field specification and the selection criteria are composed of logical fields and corresponding values. Thus, it can be determined at step 740 whether respective logical field specifications corresponding to the logical fields composing the abstract query include one or more logical links. Furthermore, it can be determined whether the respective logical field specifications are contained in category specifications having one or more associated logical links.

In the given example, the abstract query of Table VII has a search criterion (lines 003-004) including a logical condition field "Results" (line 004) described in lines 028-032 of the data abstraction model of Table V. More specifically, the condition field "Results" is defined in terms of a path through a logical tree structure corresponding to the data abstraction model of Table V, i.e., "/Patient/Tests/Results". An exemplary logical tree structure including this path is described below with reference to FIG. 8D. In one embodiment, this path is reconstructed at step 740 using the data abstraction model of Table V.

More specifically, in the given example the path traverses the logical tree structure, i.e., the data abstraction model of Table V, from the "Patient" category (lines 003-021 of Table V) to the "Tests" category (lines 022-041 of Table V). The "Tests" category includes a logical field specification (lines 029-033 of Table V) corresponding to the condition field "Results" of the abstract query. Traversing the data abstraction model of Table V from the "Patient" category to the "Tests" category for reaching the "Results" field is performed on the basis of a logical link "Patient_To_Tests". A corresponding link specification (e.g., link specification $380_1$ of FIG. 3B) is illustrated in line 020 of Table V. An associated link definition (e.g., link definition $370_1$ of FIG. 3B) is illustrated in lines 043-048 of Table V. Furthermore, the abstract query of Table VII includes as result field (line 002 of Table VII) the logical field "Name" which is described in lines 009-013 of the data abstraction model of Table V. For the "Name" field, a link specification as illustrated in lines 038-039 of Table V and a corresponding link definition as illustrated in lines 049-058 of Table V can be identified in a process similar to identification of the condition field as described above.

Figure 5:
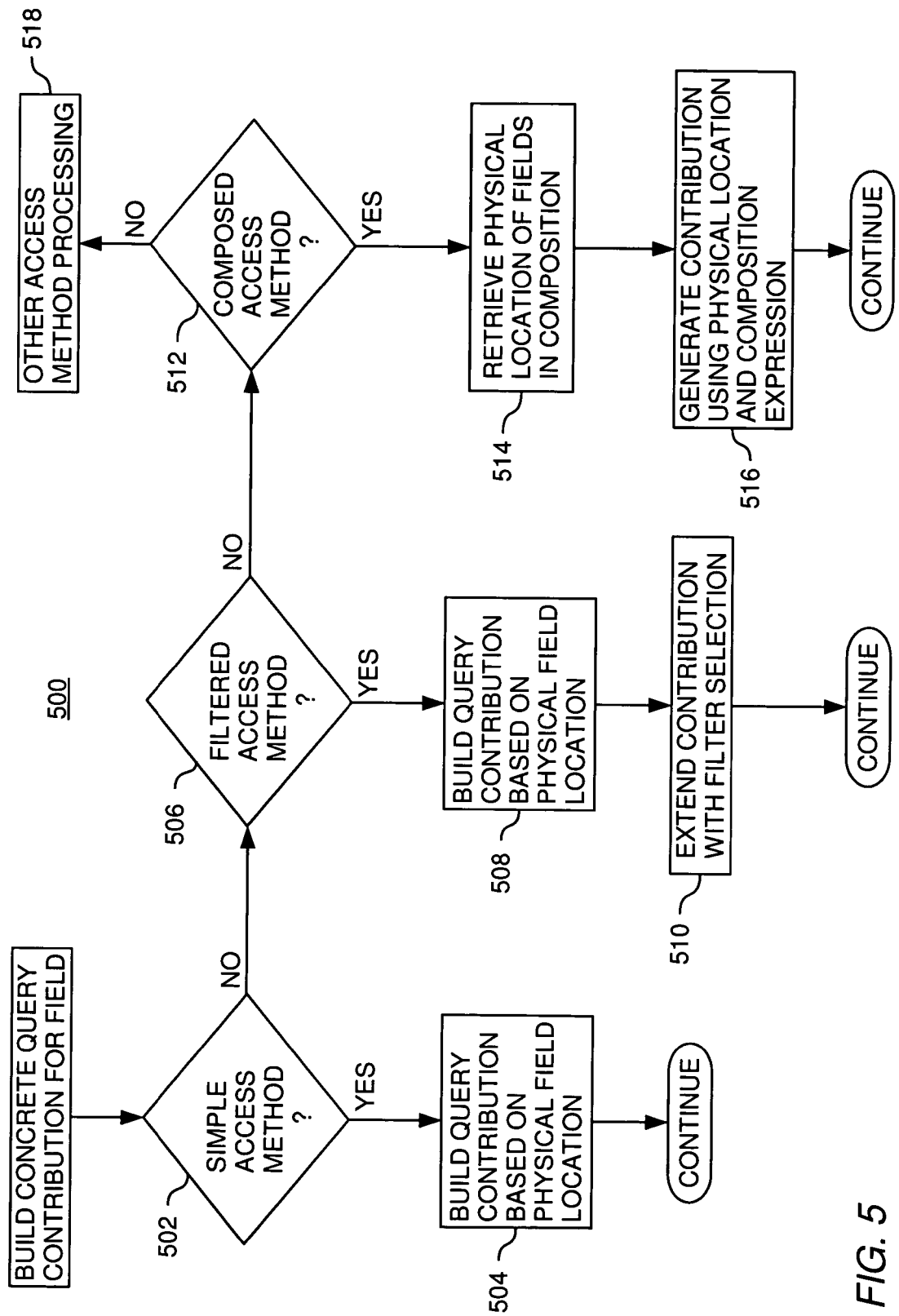

If it is determined at step 740 that the retrieved data abstraction model does not include logical links which are relevant to the abstract query, the abstract query is transformed into a concrete query at step 750 according to methods 400 and 500 illustrated in FIGS. 4 and 5, respectively. Method 700 then exits at step 780.

If, however, the retrieved data abstraction model includes relevant logical links, the relevant logical links are identified from the retrieved data abstraction model. Then, at step 770, the abstract query is transformed into a concrete query using the identified logical links. In one embodiment, the abstract query is transformed into a concrete query according to methods 400 and 500 illustrated in FIGS. 4 and 5, respectively. For instance, the abstract query is transformed into a SQL query. Then, the identified logical links are transformed into a JOIN statement for the SQL query, as illustrated below with respect to Table VIII. Method 700 then exits at step 780.

More specifically, in the given example the abstract query of Table VII can be transformed into a concrete query shown in Table VIII below using the identified logical links described above. By way of illustration, the exemplary concrete query is defined using SQL. However, any other language may be used to advantage.

TABLE VIII

EXEMPLARY CONCRETE SQL QUERY

| | |
|---|---|
| 001 | SELECT |
| 002 | T4.name |
| 003 | FROM |
| 004 | Patientinfo as T1 |
| 005 | JOIN |
| 006 | Bloodtest as T2 on T1.patient_ID=T2.patient_ID |
| 007 | JOIN |
| 008 | Employeeinfo as T3 on T2.requester= T3.employeenum |
| 009 | JOIN |
| 010 | Patientinfo as T4 on T3.patient_ID=T4.patient_ID |
| 011 | WHERE |
| 012 | T2.results> 200 |

Illustratively, the concrete SQL query includes JOIN statements in lines 005-010. The JOIN statements define in line 006 the relationship between the database tables "Patientinfo" (Table III) and "Bloodtest" (Table IV) according to the link definition in lines 043-048 of the data abstraction model of Table V. According to the link definitions in lines 049-058 of the data abstraction model of Table V, the JOIN statement in line 008 defines the relationship between the database tables "Bloodtest" (Table IV) and "Employeeinfo" (Table VI), and the JOIN statement in line 010 defines the relationship between the database tables "Employeeinfo" (Table VI) and "Patientinfo" (Table III).

As was noted above, a data abstraction model (e.g., data abstraction model 132 of FIG. 3A) can be represented by a logical tree structure having a plurality of logical branches. In one embodiment, where a plurality of data abstraction models is provided, each data abstraction model can be represented by a corresponding logical branch. In another embodiment, where only a single data abstraction model with a plurality of category specifications (e.g., category specifications $310_1$ and $310_2$ of FIG. 3A) is provided, each category can be represented as a corresponding logical branch. In other words, it should be noted that various approaches are suitable for representing one or more data abstraction models as a logical tree structure. All such approaches are broadly contemplated. An exemplary logical tree structure representing a data abstraction model is shown in FIG. 8A.

Referring now to FIG. 8A, an exemplary logical tree structure representing the data abstraction model 132 of FIG. 3A (Table II) is illustrated. The exemplary logical tree structure illustratively includes a first logical branch 800 representing the "Patient" category $310_1$ of the data abstraction model 132 and a second logical branch 850 representing the "Tests" category $310_2$. Accordingly, the first logical branch 800 includes a parent node 810 showing the category name "Patient" (i.e., category name $330_1$). Furthermore, the parent node 810 has associated child nodes 812, 814 and 816, one for each logical field contained in the "Patient" category. More specifically, node 812 corresponds to the logical field "Patient ID" $308_1$, node 814 corresponds to the logical field "Name" $308_2$, and node 816 corresponds to the logical field "Street" $308_3$. Similarly, the second logical branch 850 includes a parent node 820 showing the category name "Tests" (i.e., category name $330_2$). The parent node 820 has associated child nodes 822, 824 and 826, one for each logical field contained in the "Tests" category. More specifically, node 822 corresponds to the logical field "Normalized Results" $308_4$, node 824 corresponds to the logical field "Results" $308_5$, and node 826 corresponds to the logical field "Requester" $308_6$.

Figure 8B:
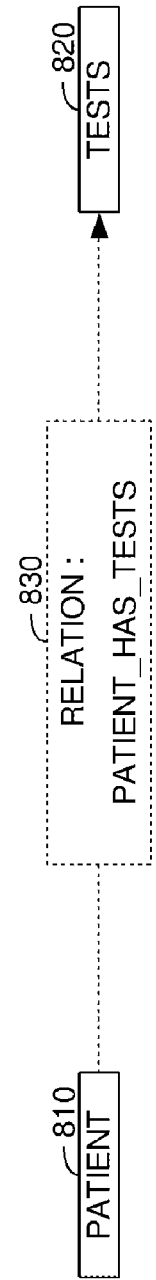
Figure 8C:
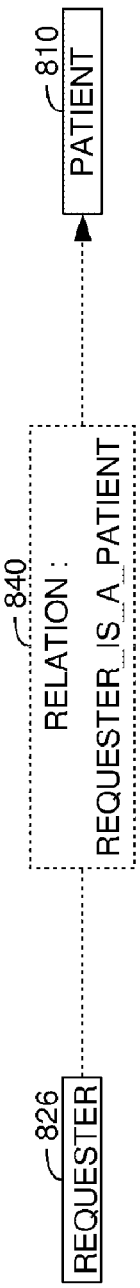

Between the first and second logical branches 800 and 850, two relationships have been identified as described above with respect to Table V. The identified relationships are illustrated in FIGS. 8B and 8C. Accordingly, in FIG. 8B a first relationship "Patient_has_Tests" 830 has been identified between the parent nodes 810 and 820. Illustratively, the relationship 830 is a "has"-type relationship. In FIG. 8C, a second relationship "Requester_is_a_Patient" 840 has been identified between the child node 826 and the parent node 810. Illustratively, the relationship 840 is a "is_a"-type relationship. Using the identified relationships 830 and 840, the logical branches 800 and 850 can be connected to form a linked logical tree structure, as illustrated in FIG. 8D.

Figure 8D:
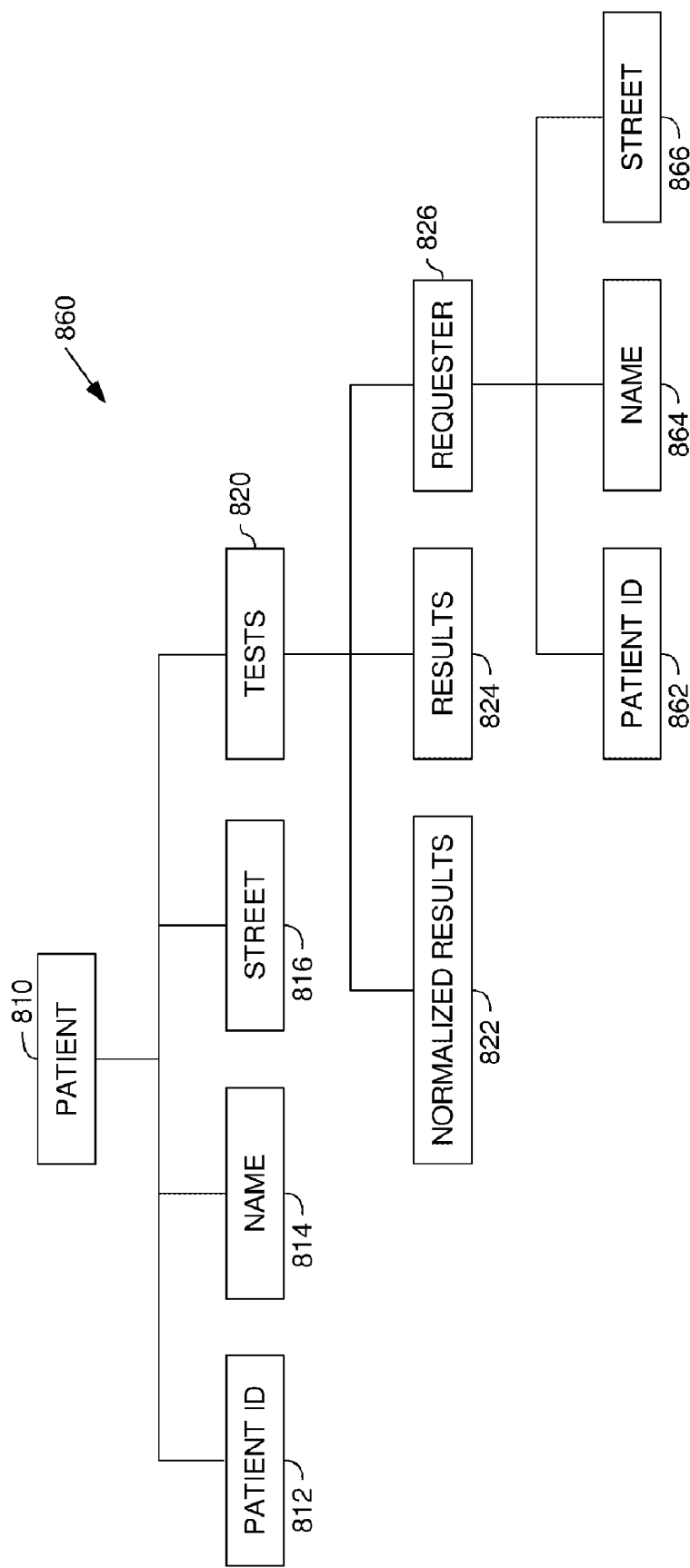

Referring now to FIG. 8D, an exemplary linked logical tree structure 860 is shown. The exemplary linked logical tree structure 860 has been created from the logical branches 800 and 850 of FIG. 8A using the identified relationships 830 and 840 of FIGS. 8B and 8C. Specifically, the linked logical tree structure 860 of FIG. 8D represents the data abstraction model 350 of FIG. 3B (Table V).

Illustratively, in the linked logical tree structure 860, the logical branch 850 has been added to the logical branch 800 according to the identified relationship 830. Furthermore, child nodes 862, 864 and 866 have been added to the "Requester" node 826 according to the identified relationship 840. The added child nodes 862, 864 and 866 provide information with respect to the "Requester" node 826, which corresponds to information provided by the child nodes 812, 814 and 816, respectively. However, it should be noted that the logical branches 800 and 850 are still accessible independent from each other. For instance, a user may still navigate through the logical branch 850 from node 820 to node 826. In other words, the linked logical tree structure 860 does not replace the logical branches 800 and 850. Instead, the linked logical tree structure is created besides these logical branches.

As was noted above, a user may use a suitable user interface for selecting logical fields from a data abstraction model as result fields for an abstract query. The user may further use a suitable user interface for specification of desired selection criteria for the abstract query. An exemplary user interface which allows user specification of desired selection criteria is described below with reference to FIGS. 9A-B.

Figure 9A:
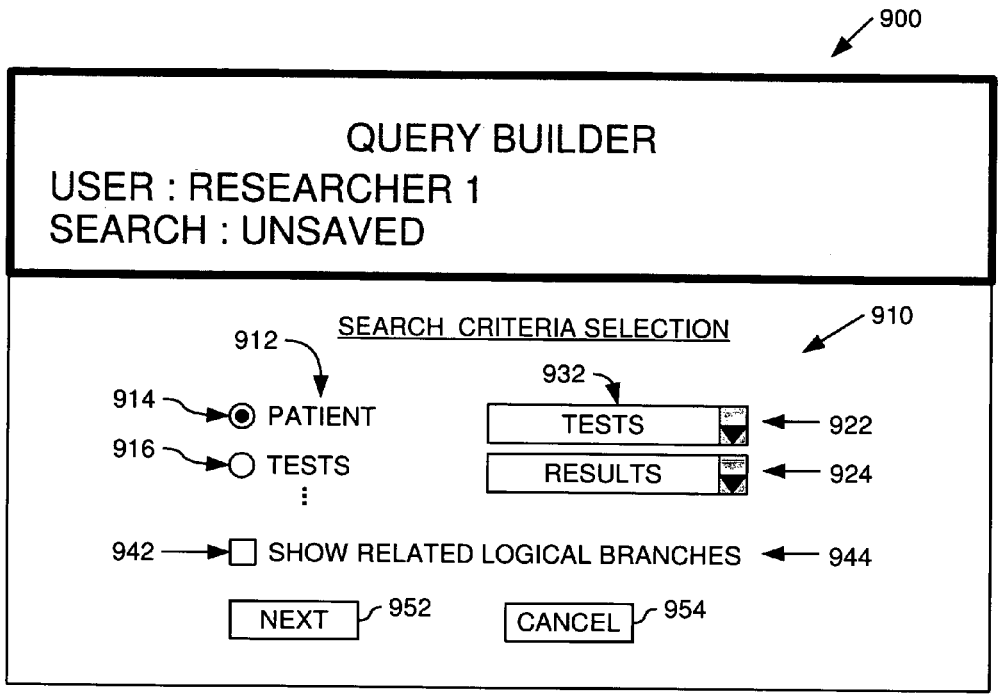
FIGS. 9A-B are screen shots illustrating user interfaces configured for specification of abstract queries in one embodiment.

Referring now to FIG. 9A, an exemplary user interface 900 is shown. The exemplary user interface 900 is configured to allow specification of an abstract query (e.g., abstract query 202 of FIG. 3). By way of example, the user interface 900 displays a search criteria selection area 910 showing a list 912 of category names (e.g., category names $330_1$ and $330_2$ of FIG. 3A). Each category name is associated with a graphical selection element. Illustratively, the graphical selection elements are shown as checkboxes. For instance, the category name "Patient" is associated with a checkbox 914 and the category name "Tests" is associated with a checkbox 916. In one embodiment, a corresponding checkbox can be selected using any suitable input device, such as a pointing device, including a computer mouse, a light pen, or even a human finger in the case of a touch screen.

According to one aspect, one of the checkboxes 914 and 916 can be selected to specify a logical field contained in the associated category as condition field to define a search criterion. To this end, each category name in the list 912 is associated with a graphical element indicating the logical fields contained in the corresponding category. Illustratively, the "Patient" category is associated with a drop-down list 922 and the "Tests" category is associated with a drop-down list 924. However, it should be noted that implementing the graphical elements as drop-down lists is merely illustrated by way of example and not for limiting the invention accordingly. Instead, any graphical elements such as pop-up windows and the like are contemplated. Furthermore, the logical fields of each category can be displayed using a logical branch representation (e.g., logical branches 800 and 850 of FIG. 8A) of a corresponding logical tree structure.

Illustratively, the checkbox 914 has been selected to select a condition field from the "Patient" category (e.g., category $310_1$ of FIG. 3A). In one embodiment, the drop-down list 922 can then be dropped down to display a list of selectable logical fields 932. By way of example, the list of selectable logical fields 932 includes all logical fields corresponding to nodes 812, 814, 816 and 820 of the linked logical tree structure 860 of FIG. 8D. Upon selection of one of the selectable logical fields, a corresponding path used traversing the linked logical tree structure 860 is tracked. By way of example, assume that the user selects the logical field "Tests" as condition field. Accordingly, a path "/Patient/Tests" can be created as the user selected the "Tests" field after selection of the "Patient" category. The user may then click a pushbutton "NEXT" 952 to continue search criteria selection or a pushbutton "CANCEL" 954 to abort the selection. Assume now that the user has clicked on the pushbutton "NEXT" 952 after selection of the "Tests" field. Accordingly, another selection area can be displayed in the user interface 900 as illustrated in FIG. 9B to continue search criteria selection.

The search criteria selection area 910 further includes an indication 944 prompting the user to indicate whether the drop-down lists 922 and 924 should display logical fields on the basis of linked logical branches. The indication 944 is associated with a checkbox 942. More specifically, if the checkbox 942 is selected, the drop-down lists 922 and 924 display logical fields on the basis of an underlying logical tree structure which has been created for the data abstraction model using logical links. If, however, the checkbox 942 is not selected, the drop-down lists 922 and 924 display logical fields on the basis of an underlying logical tree structure which has been created for the data abstraction model without use of logical links.

Figure 9B:
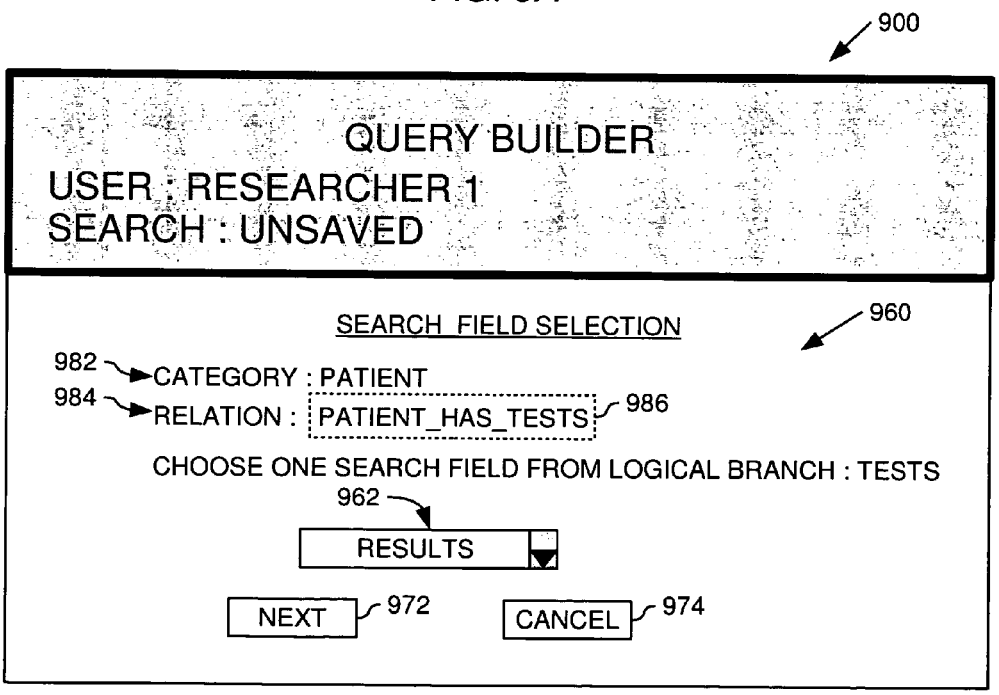

Referring now to FIG. 9B, the user interface 900 displays an exemplary condition field selection area 960. Illustratively, the exemplary condition field selection area 960 includes an indication 982 of a category, from which a condition field can be selected. The condition field selection area 960 further includes an indication 984 of a logical link if the condition field which can be selected is contained in a logical branch which is linked to the indicated category. By way of example, the indication 984 describes a logical link "Patient_has_Tests" 986 corresponding to the identified relationship 830 of FIG. 8B. In other words, all user-selectable fields displayed in a drop-down list 962 are reached from the "Patient" category by traversing the linked logical tree structure 860 using the identified relationship 830.

Upon selection of one of the selectable logical fields from drop-down list 962, a corresponding path used in traversing the linked logical tree structure 860 is tracked. By way of example, assume that the user selects the logical field "Results" as condition field. Accordingly, a path "/Patient/Tests/Results" can be created as the user selected the "Results" field after selection of the "Tests" field from the "Patient" category. The user may then click a pushbutton "NEXT" 972 to continue search criteria selection or a pushbutton "CANCEL" 974 to abort the selection. Assume now that the user has clicked on the pushbutton "NEXT" 972 after selection of the "Results" field. Accordingly, another selection area can be displayed to allow for user specification of a corresponding value and operator for the search criterion. Assume now that the user specifies as operator greater than (">") and as corresponding value "200". Thus, the user has created the search criterion "/Patients/Tests/Results>200" of the abstract query of Table VII (line 004).

CONCLUSION

By creating logical links between related logical branches, information regarding a user's intent when creating a query with logical fields that may be interpreted differently may be automatically gathered. Using this information, such a query may be properly interpreted and tables properly joined at run time.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A method of creating queries querying physical data logically represented by a data abstraction model, the method comprising:
   receiving an abstract query against physical data in a database, the abstract query having one or more result fields, each corresponding to a logical field defined by the data abstraction model; wherein each definition of a logical field in the data abstraction model comprises a reference to an access method specifying a manner of accessing and exposing portions of the physical data;
   determining that the data abstraction model includes associated logical links defining relationships between logical fields contained in the abstract query; and then:
       retrieving the associated logical links; and transforming, by operation of one or more computer processors, the abstract query into an executable query formatted for execution against the physical data, wherein the transforming is done using the data abstraction model and the retrieved associated logical links.

2. The method of claim 1, wherein determining whether the data abstraction model includes the associated logical links comprises:
   determining, for each result field of the abstract query, whether a corresponding logical field specification includes a logical link.

3. The method of claim 1, wherein determining whether the data abstraction model includes the associated logical links comprises:
   determining whether one or more result fields of the abstract query are included with a category specification including a logical link.

4. The method of claim 1, wherein each logical link defines a path between different data structures of a relational representation of the physical data in the database.

5. The method of claim 4, wherein each logical link defines a path between different data structures of a relational representation of the physical data in the database.

6. The method of claim 5, wherein the retrieved associated logical links are expressed, in the SQL query, as JOIN statement linking the different data structures.

7. A computer-readable storage medium containing a program which, when executed by a processor, performs a process of creating queries querying physical data logically represented by a data abstraction model, the process comprising:
   receiving an abstract query including logical fields against physical data in a database, the logical fields contained in the abstract query defined by the data abstraction model;
   determining that the data abstraction model includes logical links associated with the logical fields contained in the abstract query, wherein the logical links define relationships between the associated logical fields and other logical fields; and then:
   retrieving the associated logical links; and
   transforming the abstract query into an executable query capable of being executed formatted for execution against the physical data, wherein the transforming is done using the data abstraction model and the retrieved associated logical links.

8. The computer-readable medium of claim 7, wherein determining whether the data abstraction model includes the associated logical links comprises:
   determining, for each result field of the abstract query, whether a corresponding logical field specification includes a logical link.

9. The computer-readable medium of claim 7, wherein determining whether the data abstraction model includes the associated logical links comprises:
   determining whether one or more result fields of the abstract query are included with a category specification including a logical link.

10. The computer-readable medium of claim 7, wherein each logical link defines a path between different data structures of a relational representation of the physical data in the database.

11. The computer-readable medium of claim 10, wherein the executable query is a SQL query.

12. The computer-readable medium of claim 11, wherein the retrieved associated logical links are expressed, in the SQL query, as JOIN statement linking the different data structures.

* * * * *

UNITED STATES PATENT AND TRADEMARK OFFICE
CERTIFICATE OF CORRECTION

PATENT NO.         : 7,599,924 B2                                                Page 1 of 1
APPLICATION NO. : 10/877238
DATED              : October 6, 2009
INVENTOR(S)        : Dettinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1194 days.

Signed and Sealed this

Twenty-eighth Day of September, 2010

David J. Kappos
*Director of the United States Patent and Trademark Office*